(12) United States Patent
Carreker

(10) Patent No.: US 10,960,989 B2
(45) Date of Patent: Mar. 30, 2021

(54) MAGNETIC ANCHOR LANDING SYSTEM (MALS)

(71) Applicant: Raymond Carreker, Denver, CO (US)

(72) Inventor: Raymond Carreker, Denver, CO (US)

( * ) Notice: Subject to any disclaimer, the term of this patent is extended or adjusted under 35 U.S.C. 154(b) by 0 days.

(21) Appl. No.: 17/013,994

(22) Filed: Sep. 8, 2020

(65) Prior Publication Data

US 2020/0398998 A1    Dec. 24, 2020

Related U.S. Application Data

(63) Continuation of application No. 15/568,578, filed as application No. PCT/US2016/028991 on Apr. 22, 2016, now abandoned.

(60) Provisional application No. 62/151,200, filed on Apr. 22, 2015.

(51) Int. Cl.
| | |
|---|---|
| *B64F 1/12* | (2006.01) |
| *B64G 5/00* | (2006.01) |
| *B64G 1/10* | (2006.01) |
| *B64G 1/40* | (2006.01) |
| *B64G 1/62* | (2006.01) |

(52) U.S. Cl.
CPC ............. *B64F 1/12* (2013.01); *B64G 1/10* (2013.01); *B64G 1/40* (2013.01); *B64G 1/62* (2013.01); *B64G 5/00* (2013.01); *B64G 2001/1071* (2013.01)

(58) Field of Classification Search
CPC ...... B64F 1/12; B64F 1/00; B64F 1/04; F41F 3/04; F41F 3/0413; F41F 3/073; B64G 5/00; B64G 2005/005; B64G 1/002
See application file for complete search history.

(56) References Cited

U.S. PATENT DOCUMENTS

| | | | | |
|---|---|---|---|---|
| 1,567,703 A | * | 12/1925 | Broyles | B64B 1/005 244/115 |
| 3,151,826 A | * | 10/1964 | Michel | B64F 1/125 244/115 |
| 4,174,081 A | | 11/1979 | Sardanowsky | |
| 4,238,095 A | * | 12/1980 | Slater | B64B 1/66 244/115 |
| 4,272,042 A | * | 6/1981 | Slater | B64B 1/38 244/115 |
| 5,924,648 A | * | 7/1999 | Ellinthorpe | F41F 3/04 244/63 |
| 7,070,434 B2 | * | 7/2006 | Paul | F41F 3/073 174/377 |
| 9,321,541 B2 | * | 4/2016 | Utsch | B64B 1/66 |
| 9,561,871 B2 | * | 2/2017 | Sugumaran | B64F 1/005 |

(Continued)

FOREIGN PATENT DOCUMENTS

| | | | |
|---|---|---|---|
| CN | 103879563 A | | 6/2014 |
| CN | 104443419 A | * | 3/2015 |

(Continued)

*Primary Examiner* — Benjamin P Lee
(74) *Attorney, Agent, or Firm* — Cozen O'Connor

(57) ABSTRACT

An apparatus and method for securing a landed aerospace vehicle/object onto a landing pad include a use of the magnetic force to couple the landed aerospace vehicle/object with the landing pad. A magnetized base captures and is anchored onto the landing pad. The use of a rocket booster in a high-gravity environment with the ensuring extreme heat exhaust emission considers the use of an exhaust ventilation system.

16 Claims, 3 Drawing Sheets

(56) References Cited

U.S. PATENT DOCUMENTS

| | | | |
|---|---|---|---|
| 2003/0053278 A1* | 3/2003 | Belisle | B64G 1/002 |
| | | | 361/144 |
| 2019/0185162 A1* | 6/2019 | Prager | B64F 1/32 |
| 2020/0031472 A1* | 1/2020 | Martens | B64F 1/32 |
| 2020/0031473 A1* | 1/2020 | Martens | B64C 27/08 |

FOREIGN PATENT DOCUMENTS

| | | |
|---|---|---|
| CN | 1044443419 A | 3/2015 |
| KR | 1020050064537 A | 6/2006 |

* cited by examiner

MAGNETIC ANCHOR LANDING SYSTEM (MALS)

CROSS-REFERENCE TO RELATED APPLICATIONS

This application is a continuation of U.S. patent application Ser. No. 15/568,578, filed Oct. 23, 2017, which is a national stage entry of international patent application Serial No. PCT/US2016/028991, filed Apr. 22, 2016, which, in turn, claims the benefit of U.S. provisional patent application Ser. No. 62/151,200, filed Apr. 22, 2015. The disclosures of each of the foregoing patent applications are incorporated herein by reference in their entireties.

BACKGROUND

Embodiments of the MALS relate to apparatuses used by the aerospace industry and in particular the secure attachment of vertically landed airborne vehicles and placed objects onto a surface.

DESCRIPTION OF THE RELATED ART

Any discussion of the prior art throughout the specification should in no way be considered an admission that such art is widely known or forms part of common knowledge in the field.

Much research has been directed toward the reusability of space-faring aerospace vehicles with a concerted effort in preserving the first-stage booster section by landing them safely for reuse. Significant advancements in this endeavor have been achieved with the occasional catastrophic loss of vehicles due to unstable landings.

The inherent difficulty of vertically landing aerospace vehicles and the similar placement of objects and structures onto topographically challenging terrain substantially limits the access to extensive areas of interest and potential land use. Concerned parties such as the Incident Command System (ICS), military reconnaissance, and scientific research fields are greatly affected and restricted by these limitations. Operations as diverse as high angle (cliffs) and scree (steep slopes) search and rescue to extraterrestrial reconnaissance can be thwarted by the absolute dependence on flat and level touchdown zones for landing. This impediment presently limiting aeronautical and space activities must be addressed. Substantial progress has been made toward this endeavor with the conception of the variable surface landing platform (VARSLAP) (US Patent Application Publication No. US 2012-0298796-A1) which modifies the gravitational effect on objects by the implementation of disjunctive planar dynamics.

As a continuation of the quest for even greater access to obstructed terrain made possible by the VARSLAP, and with the additional benefit of permanence of placement, the MAGNETIC ANCHOR LANDGING SYSTEM (MALS) is herein presented as a position-locking apparatus that secures a base onto a substrate thereby providing secure and long-term placement in and access to a variety of difficult and otherwise inaccessible localities.

BRIEF SUMMARY

Embodiments of the Magnetic Anchor Landing System (MALS) are herein presented as a practical method and mechanism of facilitating the secure placement of an aerospace vehicle onto a surface by the use of a magnetic capture force.

For the purpose of this application, the landing of airborne vehicles and associated objects in currently inaccessible environments will be emphasized, although other varieties of objects and situations requiring similar stable placements are not necessarily precluded. In concurrence with the general definition of "base", ie, bottom or foundation, and of "mobile", ie, capable of moving or being moved, the concept and embodiments of the MALS specifically allow a vehicle or vehicle-placed object to land, be secured onto the surface by an active engagement with the substrate, and then optionally (with a reversal of the mechanism) allow the vehicle/object to again become airborne by a disengagement with the substrate.

In one embodiment of the present invention, methods and apparatuses for securing a landed aerospace vehicle/object onto a landing pad includes the use of the magnetic force to couple the vehicle/object with the landing pad. In one embodiment, a base is captured and anchored by a magnetized landing pad. In another embodiment, a magnetized base captures and is anchored onto a landing pad. In yet another embodiment, a magnetized base is coupled with a magnetized landing pad. The use of a rocket booster in a high-gravity environment with the ensuing extreme heat exhaust emission considers the use of an exhaust ventilation system in one embodiment. In yet another embodiment, micro-gravity conditions are inconsequential to the effective coupling of an aerospace vehicle/object to a landing pad.

A further embodiment is directed to a magnetic anchor landing system (MALS) comprising: a landing pad; a vehicle/object base; and a magnetic clamping force.

A further embodiment is directed to an exhaust diversion system comprising: a funneling apparatus; a tunneling apparatus; and an evacuation apparatus.

A further embodiment is directed to a method of anchoring a base onto a landing pad using the magnetic force, the method comprising: establishing a surface or surfaces on the landing pad and the vehicle/object base capable of magnetization; inducing a magnetic field on either the surface of the landing pad or the surface of the vehicle/object base or the surface of the landing pad and the surface of the vehicle/object base; and contacting the surface of the vehicle/object base with the surface of the landing pad.

A further embodiment is directed to a magnetic anchor landing system (MALS) comprising: a landing pad, a vehicle, an object base, a magnetic clamping force, and an exhaust diversion system comprising: a funneling apparatus, a tunneling apparatus, and an evacuation apparatus; wherein the landing pad enacts an electromagnetic force in response to the proximity of a landing vehicle, and wherein upon activation of the electromagnetic force, the exhaust diversion system is extended to meet the landing vehicle. In further embodiments, the magnetic anchor landing system further comprises at least one tether that is projected at the base or at the vehicle, having disposed at the end of the tether an electromagnetic feature so as to confirm the attachment between the base and the vehicle.

DETAILED DESCRIPTION

Serious efforts are being made toward the reuse of rocket boosters by landing them vertically onto a delineated landing pad. The vertical landing of a large mass, high profile rocket onto a relatively small area presents a special set of challenges including maintaining a substantially vertical profile of the vehicle at touchdown while correcting for lateral inertia of the linear mass. Lateral loading caused by internal vibration frequencies, imposed attitude adjustment maneuvers, landing gear failure, and external airflow is continually exerted upon the structure even after initial contact with the surface. Therefore, a firm coupling of the base of the vehicle with the surface is essential for providing a stable foundation against which any lateral inertial moments may be mitigated.

At present, no known method of coupling a landed booster onto the landing pad in conjunction with touchdown is practiced, leading to a situation whereby the vehicle is stabilized solely by the gravity load. As a result, lateral forces acting upon the rocket have resulted in unstable landings and collapse of the aircraft.

A landing pad, herein defined in the context of the MALS, is a constructed area onto which a vertically landed aerospace vehicle may alight which is made for that specific use. Embodiments of the MALS are herein presented to substantially mitigate lateral motion of a landed rocket booster thereby preventing the catastrophic loss of the returned vehicle during and after the inherently unstable process of touchdown, specifically by the method of cantilevering from the landing pad foundation.

Figure 1:
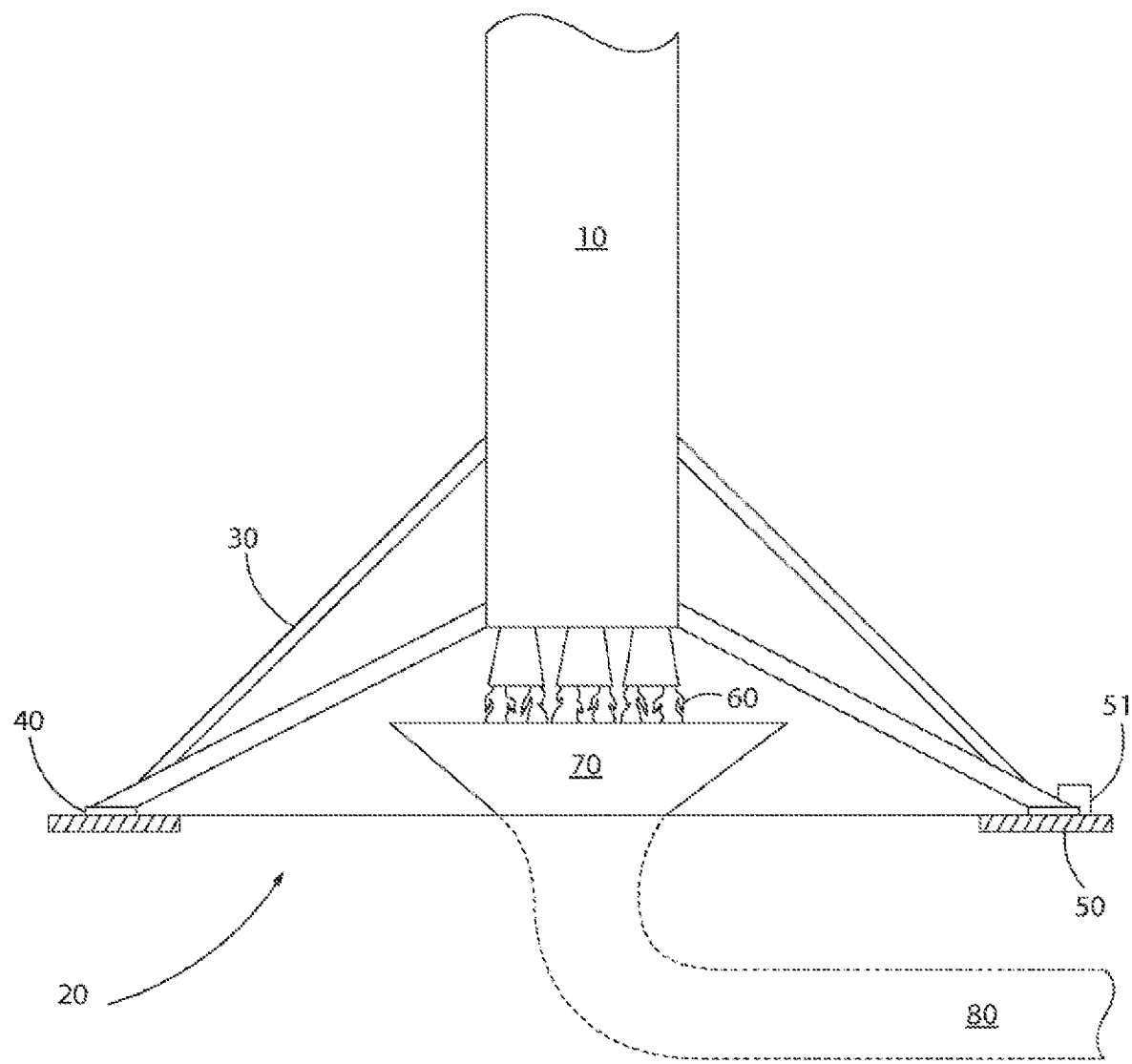
FIG. 1 is a perspective view of a landed rocket booster onto a landing pad.

Magnetic Coupling: The magnetic force is a well understood method for joining two surfaces together whereby magnetic clamping technology is frequently employed. In one embodiment of an electromagnet clamping system, an applied electrical current is used to produce a sustained magnetic field which can be terminated with a cessation of the current. In FIG. 1, an exemplary illustration representing one embodiment of the MALS displays a landed rocket booster 10 in contact with a magnetized landing pad 20 whereby the landing gear 30 is configured with a foot pad 40 composed of a temporary magnet material, which those in the art know is a material that is able to be magnetized when exposed to a magnetic field.

Figure 2:
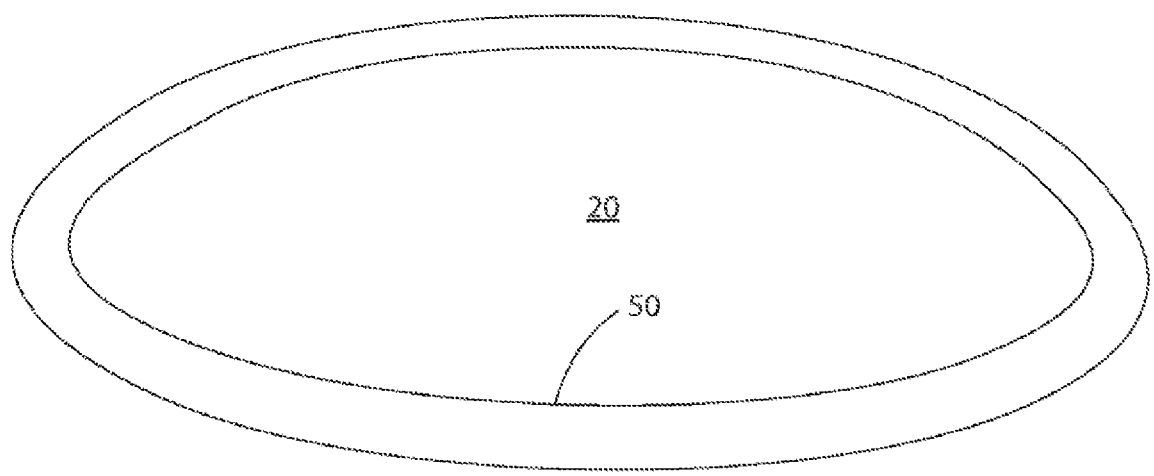
FIG. 2 is a perspective view of an embodiment of a landing pad.

In one embodiment, an electromagnet 50 incorporated into the landing pad 20 is powered to initiate a magnetic field which couples with the foot pad 40 thereby establishing a magnetic clamp between the structures. In one embodiment, the electromagnet 50 can be configured as a large diameter ring structure whereby the booster 10 would touchdown in a manner that assures point-to-point contact between the foot pad and landing pad magnetic structures. (FIG. 2).

Figure 3:
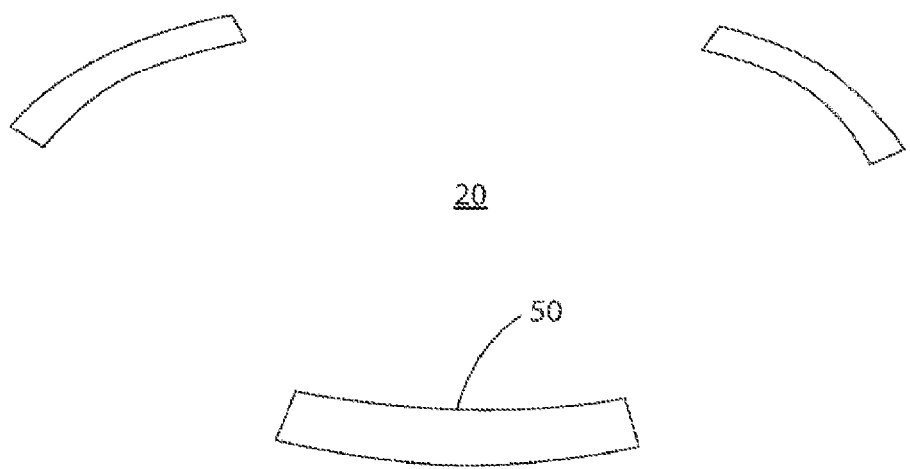
FIG. 3 is a perspective view of an embodiment of a landing pad.

In another embodiment, a series of magnetic structures 50 can be arranged within the landing pad 20 in a pattern whereby point-to-point contact of magnetic structures is effected by a more precise adjustment of the radial position of the descending booster 10 thereby aligning the position of the foot pads 40 with the positions of the separate magnetic structures. In FIG. 3, an example is shown to accommodate a 3-prong landing gear. The appropriate number of magnetic structures 50 can be used to coincide with the number of footpads 40 associated with the landing gear. With a contacting of the surfaces, the magnetic field permeating the structures would manifest as a clamp (anchorage force) with minimal structural stress whereby force is uniformly distributed onto the entire contact surface.

Referring to FIG. 1, after the coupling of the base with the surface, the booster 10 embodies a tube structure supported by the landing gear 30 which acts as transfer beams maintaining structural integrity and stability with the landing pad 20 by cantilevering from the foundation, a structural configuration known by those in the construction arts.

The previous discussion can be considered to constitute one particular embodiment of the MALS where a particular method of magnetic clamping between a base and a landing pad is elucidated. For example, the use of electromagnets and permanent magnets in both the landing pad and the base thereby inducing a coupled magnetic field is an option. Given the numerous methods and materials available and utilized for the purpose of magnetic coupling, it is herein stated that further discussion of said methods and materiel which also achieve and typify the concept of the MALS while using variations and multiple forms is beyond the scope of this document. However, such lack of discussion should not be considered a limitation in the application of the MALS concept.

Also depicted in FIG. 1 is an Exhaust Diversion Mechanism. The implementation of a magnetic field using magnets can be adversely affected by high temperatures. In order to maintain an adequate working or operating temperature, as those in the art know as that temperature above which the magnetic field is nullified, an active ventilation system can be used to blow or suck rocket exhaust gases and the accompanying heat away from the magnetic contact area. In FIG. 1, one embodiment of a ventilation system is shown whereby exhaust 60 from the rocket booster 10 is drawn into funnel receptacle 70 and directed away from the landing pad area 20 via venting pipe 80.

Figure 4:
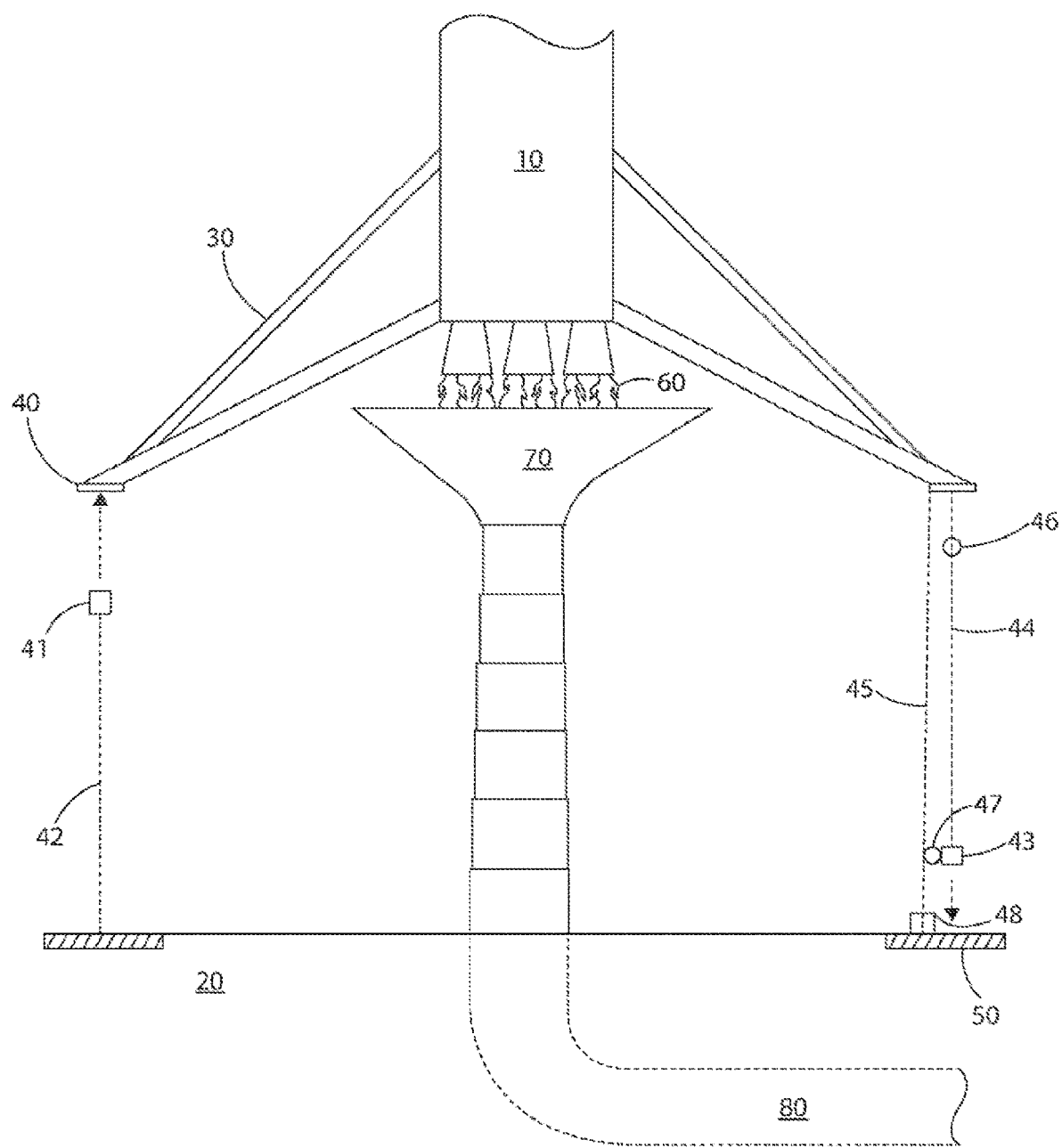
FIG. 4 is a side view of a landing system utilizing an exhaust diffusion system and further depiction and optional tether system.

In one embodiment, the ventilation system apparatus can be elevated in a telescoping manner, particularly in the vicinity of the funnel 70, to meet the descending booster 10 in order to initiate ventilation sooner and, accordingly, then descend in sync with the booster to touchdown. (FIG. 4). In addition to thermal ventilation, thermal shielding of the exhaust diversion apparatus and the magnetized landing pad area can be used to maintain an adequate operating temperature environment.

Also embodied in the MALS is the capability to achieve a secure landing in micro-gravity environments. Much research and application is being devoted to the exploration of asteroids, comets, and moons. Landing and operating on micro-gravity surfaces presents a special set of problems, the most prominent being the lack of a firm foundation. The placement of firm basal structures in micro-gravity environments has been addressed elsewhere (see: Mobile Base Anchoring Device [MOBAD], Patent Application No. WO2015069755 A1). With the establishment of an anchored base, configured as a landing pad in one embodiment, the MALS herein presented would be a major step forward in the study and habitation of micro-gravity objects.

In addition to establishing a coupling between a base and a natural substrate environment as presented throughout this document, embodiments of the MALS also enable a coupling between a base and a manufactured foundation or landing pad with the objective of establishing a static equilibrium between the structures through the use of a tethering mechanism that comprises a magnetic component. Optimally, a destruction or severe alteration of the landing pad would be avoided. Presented herein are some methods and structures whose embodiments would allow the recurring use of a specific constructed site as a coupling interface with a placed base.

Other coupling options as depicted in FIG. 1 include the use of mechanical clamping systems whereby quick-acting structural clamps 51 are used to secure joining surfaces. Mechanical clamping systems utilizing magnetic, pneumatic, hydraulic, and spring-loaded actuating devices are widely used in the automated clamping industries and can be adapted to various structural configurations. The methods and structures presented herein to secure a base onto a reusable pad using components of an automatic sequencing function whereby a sensing of the contacting of the structures initiate a coupling mechanism which clamps the connecting structures resulting in the establishment of a static equilibrium between said surfaces are embodiments of the MALS.

Therefore, in a preferred embodiment, the MALS system may be utilized to guide or assist in coupling the base with a vehicle, and wherein upon contact of the vehicle with the base, structural clamps can be activated from the base or the vehicle to provide a further mechanical connection to one another, in addition to the magnetic connection.

It is further envisioned that electromagnetic mechanisms can be employed using projectile components. Wherein, it is envisioned to deploy, via a projectile 41, an electromagnet, or magnetic component from either the base 42 or from the landing vehicle 48, wherein the projectile provides for magnetic coupling of a line 42 and 44 or tether between the base and the landing vehicle. Once the tether is complete, mechanical connections, e.g. 51 can be made to secure the line or tether to the base or vehicle and the magnetic component can be removed or eliminated. At this point, standard known wench or tether like systems can be utilized to slowly and evenly lower the landing vehicle onto the pad and secure the weight to that recovery is successfully made.

In a preferred embodiment, the tether can include a magnetic line projected from the base. Upon connection of the tether to the vehicle, a second line 45, having appropriate strength can be traversed along the tethered line for a mechanical connection to the vehicle. Tether lines, e.g. 46 and 47 can suitably traverse the prior established line. Therefore, a first magnetic line provides for a connection and then a traversal line to attach a stronger second line for mechanical tether between the base the vehicle.

In other embodiments, the vehicle comprises a tether line which can be fired to the base, to initiate the connection between the vehicles. Several projectiles, see, e.g. FIG. 4, can be fired to create an appropriate density of lines to assist in stably landing and supporting the vehicle. Sending the projectiles to different angles from the vehicle is also preferred, such as at 4 corners of a quadrilateral shaped landing base. In further embodiments, after the vehicle has tethered to the base, a second connection line may traverse along the first tethered line a second connection line for mechanical or magnetic connection to the vehicle, which has strength necessary for application of forces to assist in landing the vehicle on the base surface. Alternatively, the first or second line may also provide transmittal of electrical or data signals, which may be necessary to be directly transmitted due to potential interference with the strong electromagnetics necessary for landing of the vehicle.

In the same sense, landing and recovery of any vehicle can be completed in this manner, wherein a magnetic component is secured to the base and a tether is connected via magnetic forces between the magnetic component and the vehicle. For example, a projectile can engage a non-magnetic surface with a magnetic component, and a further line can then be magnetically secured between the projectile component that is now secured in the surface and the vehicle to be landed.

Other combinations, modifications, and conceptualizations of components, including some not addressed in this application, may be implemented with the objective of executing the functions of the MALS herein presented. The designed adaptability and modularization of the MALS concept combined with the variability of models of substrate and various combinations thereof impose a limitation to the presentation of the whole of possible embodiments. Therefore, specific embodiments herein disclosed should not be considered limiting in scope to the purpose of the MALS and variations and alternatives not herein described that are encompassed within the purpose also are considered within the domain of the MALS.

Preferred embodiments are directed to methods of landing an aerial vehicle comprising a method of anchoring a base onto a landing pad using the magnetic force, the method comprising: establishing a surface or surfaces on the landing pad and the vehicle/object base capable of magnetization; inducing a magnetic field on either the surface of the landing pad or the surface of the vehicle/object base or the surface of the landing pad and the surface of the vehicle/object base; and contacting the surface of the vehicle/object base with the surface of the landing pad. Wherein, the magnetic field is generated to connect the vehicle to the base, wherein the magnetic field assists in contacting and thereafter securing the vehicle to the base via magnetic forces.

Preferred embodiments are directed to methods of landing an aerial vehicle comprising: establishing a surface or surfaces on the landing pad and the vehicle/object base capable of magnetization; inducing a magnetic field on either the surface of the landing pad or the surface of the vehicle/object base or the surface of the landing pad and the surface of the vehicle/object base; extending an exhaust diversion system comprising a funneling apparatus towards the exhaust of the vehicle; and wherein the extension of the exhaust diversion system engages the landing system to generate an electromagnetic field; and contacting the surface of the vehicle/object base with the surface of the landing pad. Wherein, the magnetic field is generated to connect the vehicle to the base, wherein the magnetic field assists in contacting and thereafter securing the vehicle to the base via magnetic forces. Accordingly, the electromagnetic field is only applied once the vehicle is in sufficient proximity to engage the exhaust diversion system. Alternatively, the reverse may be applied, wherein the exhaust diversion system is extended only upon the activation of an electromagnetic system.

Preferred embodiments are directed to methods of landing an aerial vehicle comprising: establishing a surface or surfaces on the landing pad and the vehicle/object base capable of magnetization; inducing a magnetic field on either the surface of the landing pad or the surface of the vehicle/object base or the surface of the landing pad and the surface of the vehicle/object base; engaging a projectile to connect a tether between the vehicle and the landing pad, extending an exhaust diversion system comprising a funneling apparatus towards the exhaust of the vehicle; and wherein the extension of the exhaust diversion system engages the landing system to generate an electromagnetic field; and contacting the surface of the vehicle/object base with the surface of the landing pad. Wherein, the magnetic field is generated to connect the vehicle to the base, wherein the magnetic field assists in contacting and thereafter securing the vehicle to the base via magnetic forces. Accordingly, the projectile connects the landing pad and the vehicle with a tether so as to assist in engaging the landing pad to the vehicle.

What is claimed is:

1. A magnetic anchor landing system comprising:
    a landing pad sized and dimensioned to couple to a base structure of an aerospace vehicle;
    a magnetic clamping force generator operative to generate a magnetic clamping force to urge the landing pad and the base structure together; and
    an exhaust diversion system comprising:
        a funneling apparatus positioned and dimensioned to receive exhaust gases emitted from an engine of the vehicle; and
        an evacuation apparatus to communicate the exhaust gases received by the funneling apparatus away from the landing pad;
    wherein the magnetic clamping force generator is activated to generate an electromagnetic force in response to a proximity of the vehicle to the landing pad.

2. The magnetic anchor landing system of claim 1, wherein the funneling apparatus is selectively extendable in a direction normal to the landing pad to receive exhaust from the vehicle.

3. The magnetic anchor landing system of claim 2, wherein the funneling apparatus is extended as a function of activation of the magnetic clamping force generator.

4. The magnetic anchor landing system of claim 1 wherein the magnetic clamping force generator is disposed in the landing pad.

5. The magnetic anchor landing system of claim 4 wherein the magnetic clamping force generator is configured as a ring having a diameter dimensioned to accommodate the base structure.

6. The magnetic anchor landing system of claim 5 wherein the ring comprises a series of discrete magnetic structures.

7. The magnetic anchor landing system of claim 4 wherein the base structure comprises foot pads and wherein the magnetic clamping force generator is configured for point-to-point contact with the foot pads.

8. The magnetic anchor landing system of claim 1 wherein the magnetic clamping force generator is a selectively activated electromagnet.

9. The magnetic anchor landing system of claim 1 wherein the magnetic clamping force generator is disposed in the base structure of the vehicle.

10. The magnetic anchor landing system of claim 1 further comprising a mechanical clamp structure to secure the base structure to the landing pad upon coupling.

11. A method of securing an aerospace vehicle to a landing pad; the method comprising:
    providing a landing pad sized and dimensioned to couple to a base structure of an aerospace vehicle;
    employing a funneling apparatus to receive exhaust gases emitted from an engine of the vehicle and to communicate the exhaust gases to an evacuation apparatus;
    employing the evacuation apparatus to communicate the exhaust gases away from the landing pad; and
    selectively generating a magnetic clamping force to urge the landing pad and the base structure together; wherein the selectively generating is responsive to a proximity of the vehicle to the landing pad.

12. The method of claim 11 wherein the employing a funneling apparatus comprises selectively extending a funnel structure in a direction normal to the landing pad to receive exhaust from the vehicle.

13. The method of claim 12 further comprising selectively extending the funnel structure as a function of the selectively generating a magnetic clamping force.

14. The method of claim 12 wherein the employing a funneling apparatus comprises selectively retracting the funnel structure in a direction of the landing pad as a function of a distance between the vehicle and the landing pad.

15. The method of claim 11 wherein the selectively generating a magnetic clamping force comprises activating an electromagnet disposed in the landing pad.

16. The method of claim 11 further comprising deploying a mechanical clamp to secure the base structure to the landing pad.

* * * * *